United States Patent
Kassab

(10) Patent No.: US 7,633,696 B2
(45) Date of Patent: Dec. 15, 2009

(54) FLY HEIGHT CALIBRATION FOR READ/WRITE HEADS

(75) Inventor: Roger J. Kassab, Shrewsbury, MA (US)

(73) Assignee: Seagate Technology LLC, Scotts Valley, CA (US)

( * ) Notice: Subject to any disclaimer, the term of this patent is extended or adjusted under 35 U.S.C. 154(b) by 396 days.

(21) Appl. No.: 11/700,269

(22) Filed: Jan. 31, 2007

(65) Prior Publication Data

US 2007/0230002 A1  Oct. 4, 2007

Related U.S. Application Data

(60) Provisional application No. 60/743,916, filed on Mar. 29, 2006.

(51) Int. Cl.
*G11B 27/36* (2006.01)
(52) U.S. Cl. .......................................... 360/31; 360/75
(58) Field of Classification Search .................. None
See application file for complete search history.

(56) References Cited

U.S. PATENT DOCUMENTS

| | | | |
|---|---|---|---|
| 7,061,706 B2 * | 6/2006 | Conteras et al. | 360/75 |
| 7,423,829 B2 * | 9/2008 | Bang et al. | 360/75 |
| 2006/0139789 A1 * | 6/2006 | Yang | 360/75 |
| 2007/0127147 A1 * | 6/2007 | Yokohata et al. | 360/31 |

* cited by examiner

*Primary Examiner*—Jason C Olson
(74) *Attorney, Agent, or Firm*—David K. Lucente

(57) ABSTRACT

A fly height controller that controls fly height of a read/write head relative to a rotating data storage disk is calibrated. A heater signal is applied to a heater element to heat the head. The level of a write current that is conducted through the head is increased until the head contacts the disk. The fly height controller is calibrated based on at least a first level of the heater signal and a first level of the write current when the head contacts the disk.

20 Claims, 6 Drawing Sheets

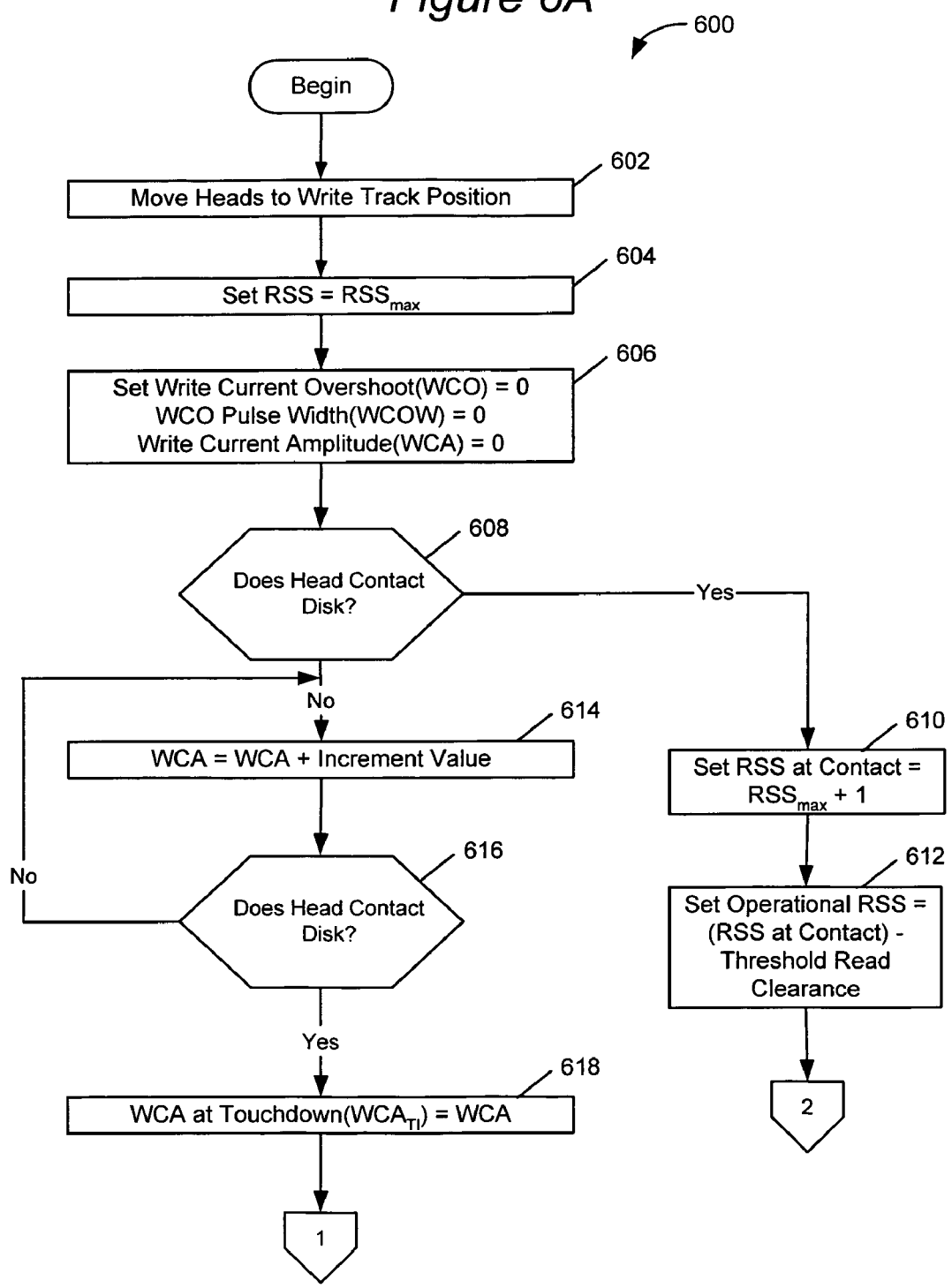

FLY HEIGHT CALIBRATION FOR READ/WRITE HEADS

RELATED APPLICATION

This application claims the benefit of and priority to U.S. Provisional Patent Application No. 60/743,916, filed Mar. 29, 2006, the disclosure of which is hereby incorporated herein by reference as if set forth in its entirety.

FIELD

The present invention generally relates to disk drive data storage devices and, more particularly, to controlling read/write head flying height relative to a rotating data storage disk of a disk drive.

BACKGROUND

Disk drives are digital data storage devices which allow host computers to store and retrieve large amounts of data in a fast and efficient manner. A typical disk drive includes a plurality of magnetic recording disks which are mounted to a rotatable hub of a spindle motor and rotated at a high speed. An array of read/write heads is disposed adjacent to data storage surfaces of the disks to transfer data between the disks and a host computer. The heads can be radially positioned over the disks by a rotary actuator and a closed loop servo system, and can fly in close proximity to the surfaces of the disks upon air bearings. The heads each typically contain a separate read element and write element.

Higher data storage density on the disks may be obtained by reading and writing data on narrower tracks on the disks and by maintaining a corresponding smaller flying height gap between the heads and the data storage surfaces. The flying height of a head can vary in response to air density changes in the disk drive, and in response to head temperature variations which can affect the distance that the tip of the head protrudes therefrom (i.e., pole-tip protrusion). Some disk drives use a heater to controllably heat the head in order to vary the flying height of the head.

Maintaining the head flying height within an acceptable range is becoming increasingly more difficult as that range is reduced to obtain higher data storage densities. Operation outside the acceptable range may result in an unacceptable read/write bit error rate and/or undesirable contact between a head and a data storage surface and potential loss of data and/or damage to the data storage surface.

SUMMARY

Some embodiments of the present invention are directed to methods of calibrating a fly height controller. A heater signal is applied to a heater element to heat a read/write ahead. A write current that is conducted through the head is increased to further heat the head until the head contacts a data storage disk. The fly height controller is calibrated based on at least a first level of the heater signal and a first level of the write current when the head contacts the disk.

Some other embodiments are directed to a circuit for calibrating a fly height controller. A heater signal is applied to a heater element to heat the head. A write current is applied to the head and is increased until the head contacts the disk. The fly height controller is calibrated based on at least a first level of the heater signal and a first level of the write current when the head contacts the disk.

In some further embodiments, while the head is not being heated by the write current, the heater signal is increased until either a threshold level is reached or the head contacts the disk. When the head contacts the disk before the heater signal reaches the threshold level, the fly height controller is calibrated based on a level of the heater signal when the head contacted the disk. In contrast, when the head does not contact the disk and the heater signal reaches the threshold level, a defined level of the heater signal is applied to the heater element, the write current is increased until the head contacts the disk, and the fly height controller is calibrated based on at least the first heater signal level and the first write current level when the head contacts the disk.

In some further embodiments, in response to the head contacting the disk, the heater signal is decreased by an amount that is sufficient to cause at least a threshold fly height between the head and the disk. The write current is increased above the first write current level until the head contacts the disk a second time. The fly height controller is calibrated based on a level of the heater signal and a level of the write current when the head contacts the disk the second time and based on the first heater signal level and the first write current level.

In some further embodiments, the fly height controller is calibrated based on test processes carried out at a plurality of radial locations across the disk and/or for a plurality of read/write heads in a head disk assembly.

DESCRIPTION OF THE DRAWINGS

FIGS. 6A-B are flow charts that illustrate operations and methods for calibrating a fly height controller using a heater element and write current to cause a head to contact a disk in accordance with some embodiments.

DETAILED DESCRIPTION

The present invention now will be described more fully hereinafter with reference to the accompanying drawings, in which embodiments are shown. This invention may, however, be embodied in many alternate forms and should not be construed as limited to the embodiments set forth herein.

Accordingly, while the invention is susceptible to various modifications and alternative forms, specific embodiments thereof are shown by way of example in the figures and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the terms "and/or" and "/" include any and all combinations of one or more of the associated listed items. It will be understood that, although the terms first, second, etc. may be used herein to describe various steps, elements and/or regions, these steps, elements and/or regions should not be limited by these terms. These terms are only used to distinguish one step/element/region from another step/element/region. Thus, a first step/element/region discussed below could be termed a second step/element/region without departing from the teachings of the present invention.

The present invention may be embodied in hardware and/or in software (including firmware, resident software, microcode, etc.). Consequently, as used herein, the term "signal" may take the form of a continuous waveform and/or discrete value(s), such as digital value(s) in a memory or register.

The present invention is described below with reference to block diagrams of disk drives, disks, controllers, and operations according to various embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show what may be a primary direction of communication, it is to be understood that communication may occur in the opposite direction to the depicted arrows.

Figure 1:
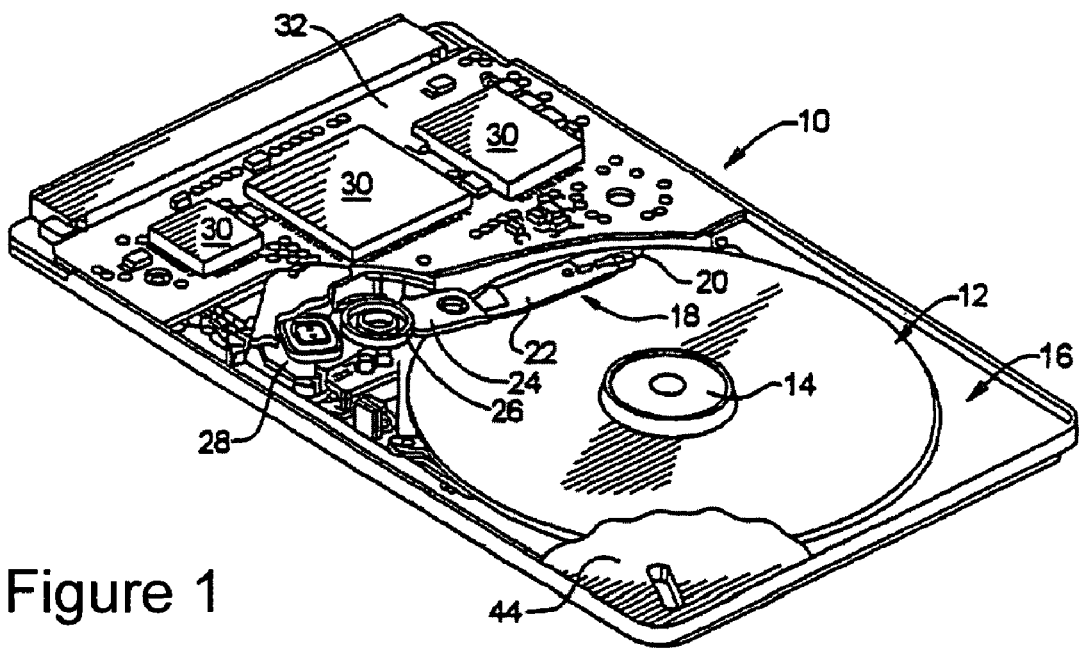
FIG. 1 is a perspective view of a disk drive with electronic circuits that are configured in accordance with some embodiments.

A simplified diagrammatic representation of a disk drive, generally designated as 10, is illustrated in FIG. 1. The disk drive 10 includes a disk stack 12 (illustrated as a single disk in FIG. 1) that is rotated by a spindle motor 14. The spindle motor 14 is mounted to a base plate 16. An actuator arm assembly 18 is also mounted to the base plate 16. The disk drive 10 is configured to store and retrieve data responsive to write and read commands from a host device. A host device can include, but is not limited to, a desktop computer, a laptop computer, a personal digital assistant (PDA), a digital video recorder/player, a digital music recorder/player, and/or another electronic device that can be communicatively coupled to store and/or retrieve data in the disk drive 10.

The actuator arm assembly 18 includes a head 20 (or transducer) mounted to a flexure arm 22 which is attached to an actuator arm 24 that can rotate about a pivot bearing assembly 26. The head 20 may, for example, include a magnetoresistive (MR) element and/or a thin film inductive (TFI) element. The actuator arm assembly 18 also includes a voice coil motor (VCM) 28 which radially moves the head 20 across the disk stack 12. The spindle motor 14 and actuator arm assembly 18 are coupled to a controller, read/write channel circuits, and other associated electronic circuits 30 which are configured in accordance with at least one embodiment, and which can be enclosed within one or more integrated circuit packages mounted to a printed circuit board (PCB) 32. The controller, read/write channel circuits, and other associated electronic circuits 30 are referred to below as a "controller" for brevity. The controller 30 may include analog circuitry and/or digital circuitry, such as a gate array and/or microprocessor-based instruction processing device.

Figure 2:
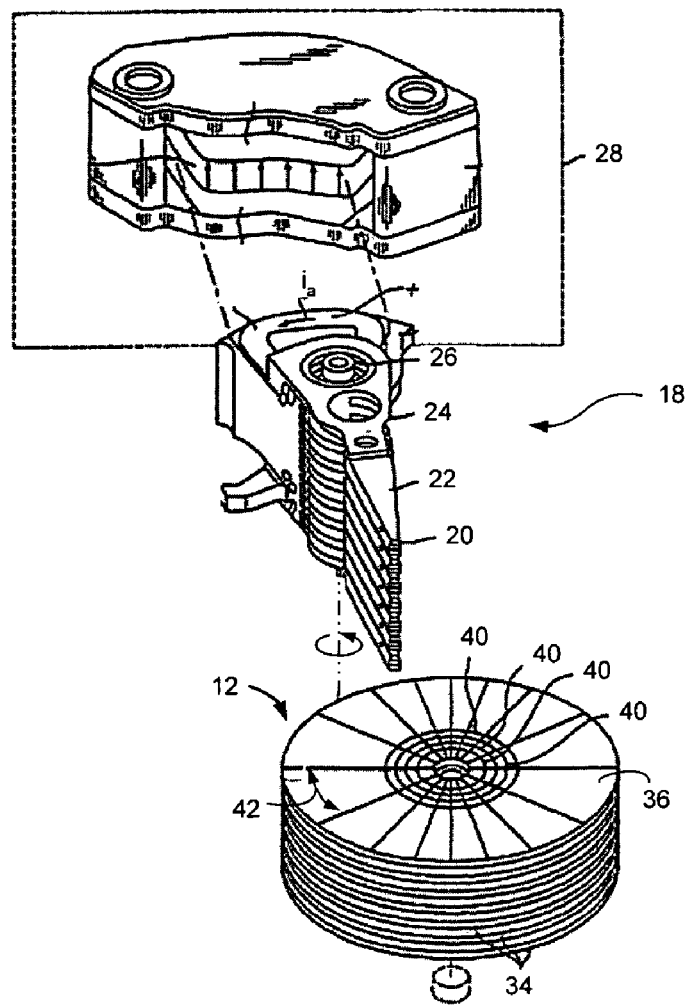
FIG. 2 is a block diagram of an exemplary head disk assembly of the disk drive.

Referring now to the illustration of FIG. 2, the disk stack 12 typically includes a plurality of disks 34, each of which may have a pair of disk surfaces 36. The disks 34 are mounted on a cylindrical shaft and are rotated about an axis by the spindle motor 14.

The actuator arm assembly 18 includes a plurality of the heads 20, each of which is positioned to be adjacent to a different one of the disk surfaces 36. Each head 20 is mounted to a corresponding one of the flexure arms 22. The VCM 28 operates to move the actuator arm 24, and thus moves the heads 20 across their respective disk surfaces 36. The heads 20 are configured to fly on an air cushion relative to the data recording surfaces 36 of the rotating disks 34 while writing data to the data recording surface responsive to a write command from a host device or while reading data from the data recording surface to generate a read signal responsive to a read command from the host device.

FIG. 2 further illustrates tracks and spokes on the disks 34. Data is stored on the disks 34 within a number of concentric tracks 40 (or cylinders). Each track 40 is divided into a plurality of radially extending sectors 42. Each sector is further divided into a servo sector and a data sector. The servo sectors of the disks 34 are used to, among other things, accurately position the head 20 so that data can be properly written onto and read from a selected one of the disks 34. The data sectors are where non-servo related data (i.e., host device data) is stored and retrieved.

Figure 3:
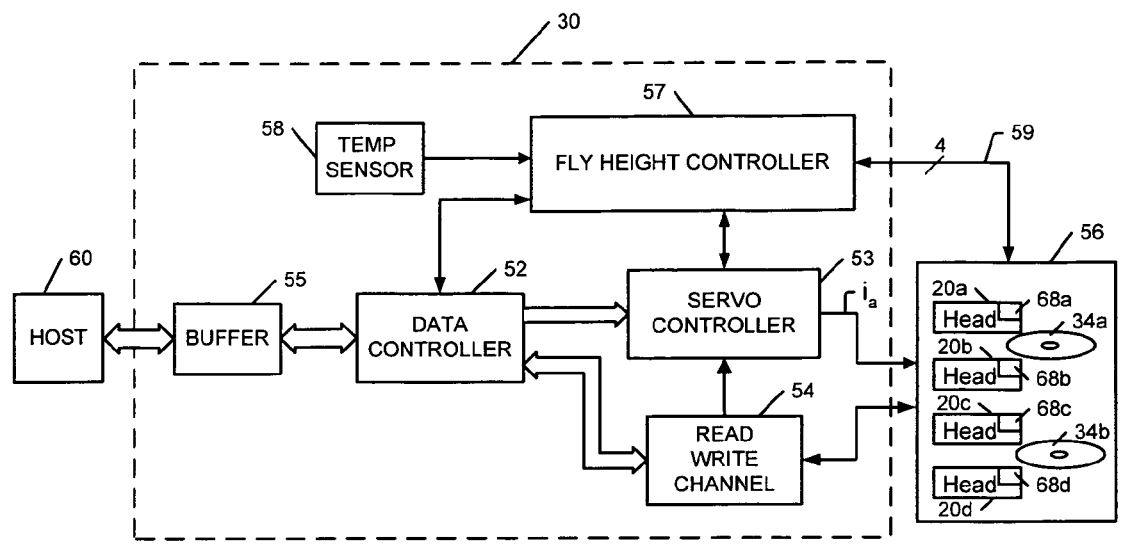
FIG. 3 is a block diagram of a portion of the controller of the disk drive shown in FIG. 1 and associated methods that are configured in accordance with some embodiments.

FIG. 3 is a block diagram of a host device 60 that is communicatively connected to a portion of the controller 30 of the disk drive 10 shown in FIG. 1 according to some embodiments. The controller 30 can include a data controller 52, a servo controller 53, a read write channel 54, a buffer 55, a fly height controller 57, and an air temperature sensor 58. Although the controllers 52, 53, and 57, the buffer 55, and the read write channel 54 have been shown as separate blocks for purposes of illustration and discussion, it is to be understood that their functionality described herein may be integrated within a common integrated circuit package or distributed among more than one integrated circuit package. The head disk assembly (HDA) 56 can include a plurality of the disks 34*a-b*, a plurality of the heads 20*a-d* mounted to the actuator arm assembly 18 and positioned adjacent to different data storage surfaces of the disks 34*a-b*, the VCM 28, and the spindle motor 14.

Write commands and associated data from the host device 60 are buffered in the buffer 55. The data controller 52 is configured to carry out buffered write commands by formatting the associated data into blocks with the appropriate header information, and transferring the formatted data from the buffer 55, via the read/write channel 54, to logical block addresses (LBAs) on the disk 34 identified by the associated write command.

The read write channel 54 can operate in a conventional manner to convert data between the digital form used by the data controller 52 and the analog form conducted through the heads 20 in the HDA 56. The read write channel 54 provides servo positional information read from the HDA 56 to the servo controller 53. The servo positional information can be used to detect the location of the head 20 in relation to LBAs on the disk 34. The servo controller 53 can use LBAs from the data controller 52 and the servo positional information to seek the head 20 to an addressed track and block on the disk 34, and to maintain the head 20 aligned with the track while data is written/read on the disk 34.

The fly height controller 57 is configured to controllably heat the heads 20 to control their flying heights relative to the data recording surfaces 36 of the disks 34. With continuing reference to FIG. 3, the HDA 56 includes a plurality of heater elements 68a-d attached to different ones of the heads 20a-d. The fly height controller 57 generates heater signals 59 which are conducted through the heater elements 68a-d to generate heat therefrom and, thereby, heat the heads 20a-d. The fly height controller 57 controls the height adjustment signals 59 to control heating of the heads 20a-d and cause a controllable amount of thermally-induced elastic deformation of the heads 20a-d and, thereby, control the flying heights of the heads 20a-d.

Although four heater signals 59 have been shown in FIG. 3, and which may be used to separately control heating by different ones of the heater elements 68a-d, it is to be understood that more or less heater signals 59 may be used to control the heater elements 68a-d and that, for example, the heater elements 68a-d may be controlled by a single common heater signal 59.

While reading data through a selected head 20a, the fly height controller 57 can set the heater signal 59 to a predefine signal level, referred to as an operational Read Steady-State (RSS) heater signal level, to provide a defined amount of heating to the selected head 20a and result in a head fly height within an acceptable range. However, due to variation in manufacturing tolerances, some heads may exhibit a different fly height response than other heads when their associated heater elements are subjected to the same operational RSS heater signal level, when they are subjected to the same read-writing duty cycles, and/or when subjected to the same air pressure/humidity conditions.

The fly height controller 57 may be calibrated to adjust the operational RSS heater signal level so as to compensate for the unique fly height response of each of the heads 20a-d. In some embodiments, the fly height controller 57 can use a selected heater element 68 alone, or combination with a write signal, to increase the temperature of a selected head 20 until the head 20 contacts the disk 34. The fly height controller 57 can then calibrate its fly height control (e.g., via adjusting the operational RSS heater signal level) based on the corresponding level of the heater signal 59 and write signal when the selected head 20 contacted the disk 34.

Figure 4:
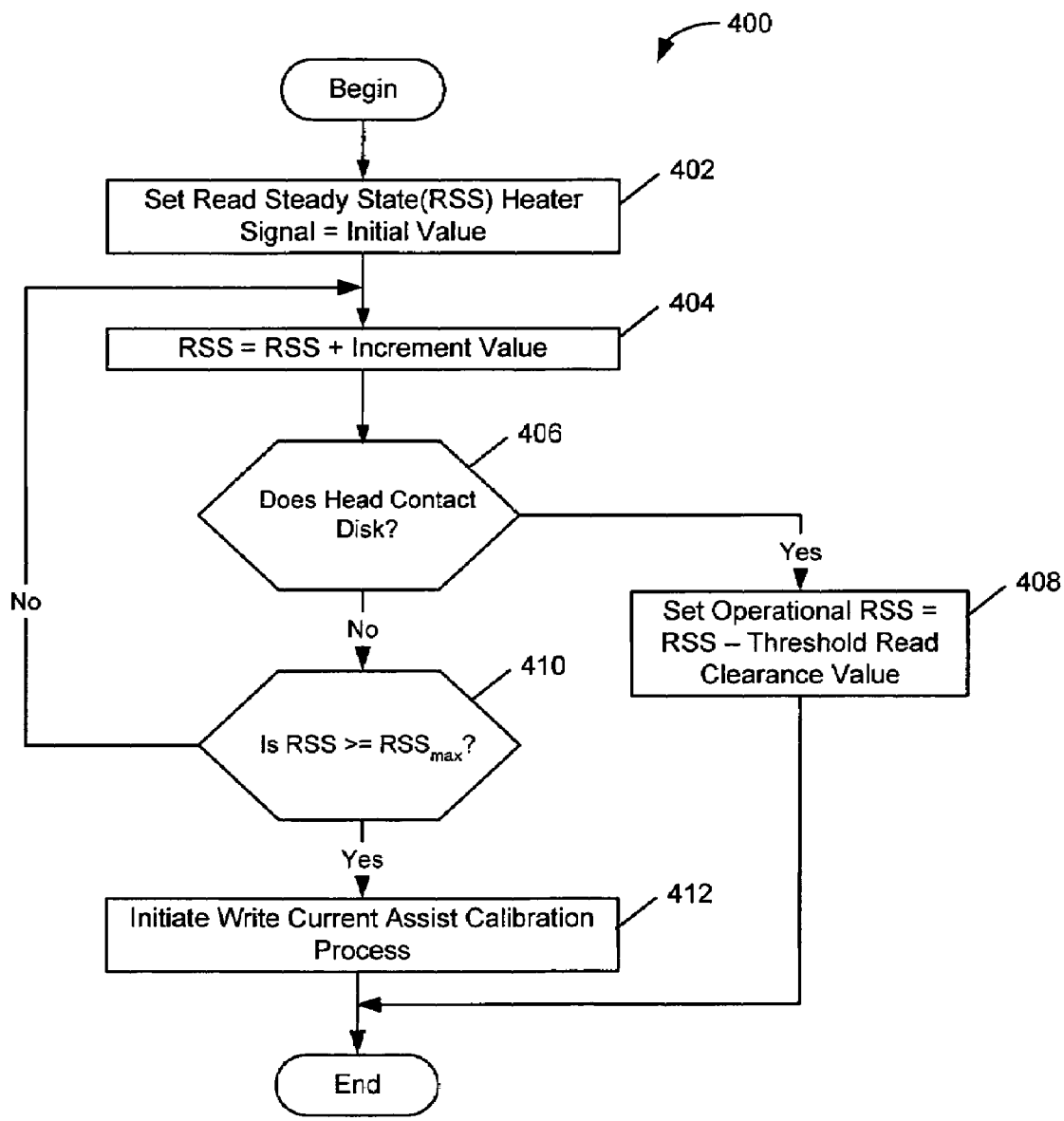
FIG. 4 is a flow chart that illustrates operations and methods for calibrating a fly height controller in accordance with some embodiments.
Figure 6B:
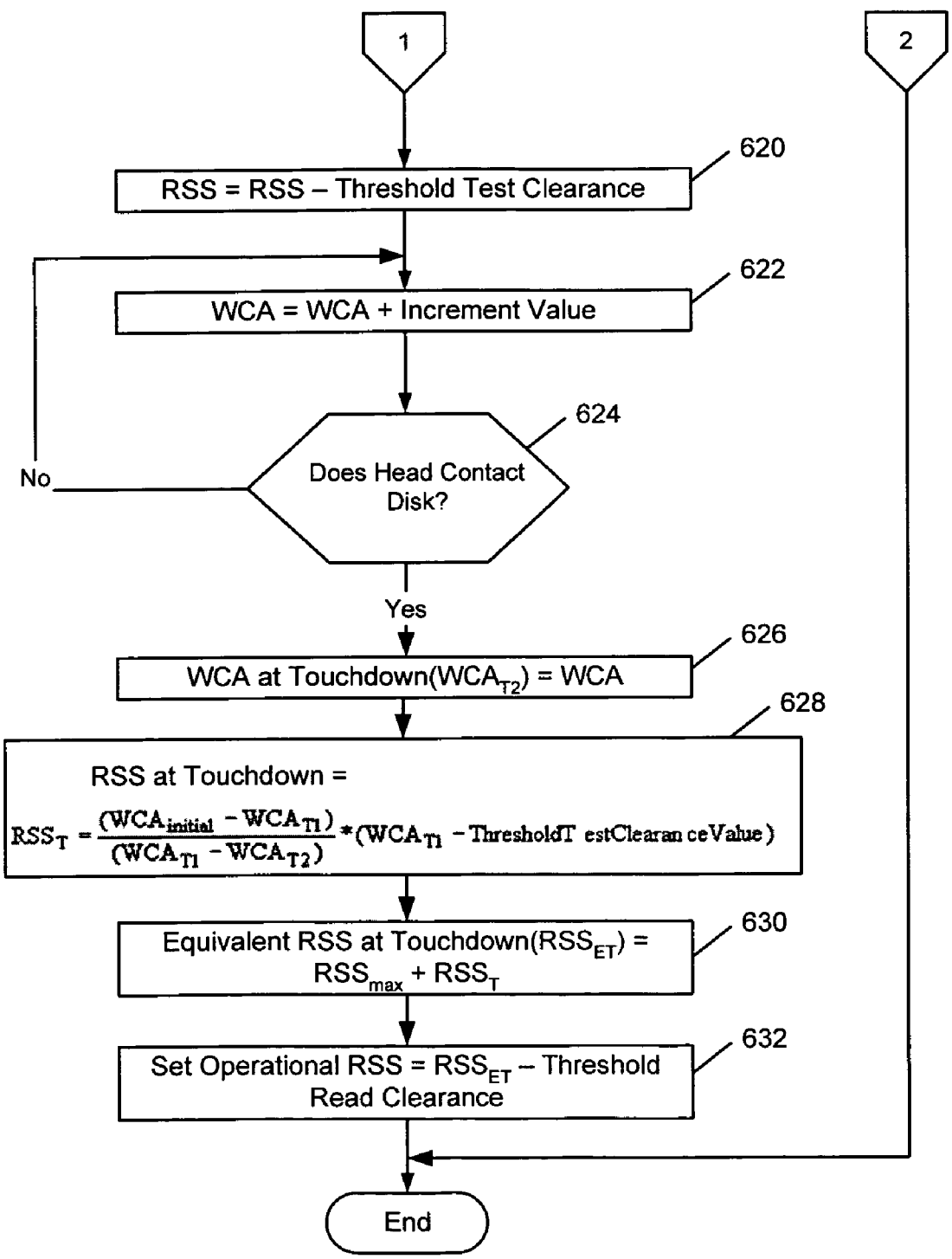

FIG. 4 is a flow chart that it illustrates exemplary operations and methods 400 for calibrating the fly height controller 57 using the heater elements 68 and without using a write current to assist with heating a selected head. FIG. 6 is a flow chart that illustrates operations and methods 600 for calibrating the fly height controller 57 by heating a selected head, using the heater elements 68 and a write current, to a temperature that is sufficient to cause the selected head to contact a corresponding disk. Although the operation of the fly height controller 57 is described below in the context of calibrating fly height control of a particular selected head 20a, is to be understood that the operations and methods can be used to separately calibrate the fly height of any number of individual heads.

With initial reference to FIG. 4, while the selected head 20a is not being heated by a write signal (e.g., while reading data), the RSS heater signal 59 for the corresponding RSS heater elements 68a is set (at Block 402) to an initial value. The initial value of the RSS heater signal 59 may be defined based on expected characteristics (e.g., size and general structural configuration) of the selected head 20a to provide at least a threshold fly height over the disk 68a. The RSS heater signal 59 is increased (at Block 404), such as by incrementing a value of the RSS heater signal 59 by a defined incremental value. After a defined response time has elapsed following the increase in RSS heater signal 59, a determination is made (at Block 406) as to whether the selected head 20a contacted the disk 34a. The response time can be sufficiently long to allow the head fly height to obtain a steady-state response to the change in RSS heater signal 59. Contact between the head 20a and the disk 34a may be determined based on, for example, the servo controller 53 generating a position error signal for the head 20a (via the servo positional information from the read write channel 54) that exceeds a threshold limit and which is indicative of the head 20a being pushed off-track due to contact with the disk 34a.

When the head 20a is determined (at Block 406) to have contacted the disk 34a, the operational RSS heater signal level can be determined (at Block 408) based on the level of the RSS heater signal 59 which caused the head 20a to contact the disk 34 but reduced by a value that will provide a threshold fly height during read operations (i.e., a threshold read clearance value). The fly height controller 57 can then set the RSS heater signal 59 to the defined operational RSS heater signal level to heat to the head 20a and cause its fly height to be within an acceptable range when the head 20a is to be used to read data from the disk 34a. The fly height controller 57 may thereby be calibrated so as to compensate for the unique fly high characteristics of the head 20a.

When the head 20a is determined (at Block 406) to have not contacted the disk 34a, a further determination is made (at Block 410) as to whether the RSS heater value 59 has reached an operational limit (RSSmax). There is an operational limit as to how much power can be supplied through the RSS heater signal 59 via, for example, a digital-to-analog converter in the fly height controller 57, and/or an operational limit as to how much heat the heater elements 68a-d can generate before becoming damaged. When the RSS heater signal 59 has not reached the operational limit, operations are repeated to further increase (at Block 406) the RSS heater signal 59 and to determine (at Block 406) whether the head 20a has contacted the disk 34a.

In some situations, the fly height controller 57 may increase the RSS heater signal 59 up to the operational limit without achieving contact between the head 20a and the disk 34a. Accordingly, further heating of the head 20a is necessary to cause such contact. Thus, when the RSS heater signal 59 has reached the operational limit without the head 20a contacting the disk 34a, a write current assist calibration process is initiated (at Block 412).

In accordance with various further embodiments, when the fly height controller 57 has increased the RSS heater signal 59 up to the operational limit without causing the head 20a to contact the disk 34a, the fly height controller 57 then controls a write current conducted through the read write channel 54 and the head 20a to further heat the head 20a. More particularly, the fly height controller 57 can continue to increase the magnitude of the write current until the head 20a is sufficiently heated to contact the disk 34a. The fly height controller 57 can then calibrate its fly high control by, for example, determining the operational RSS heater signal level based on a first level of the RSS heater signal 59 and a first level of the write current present when the head 20a contacted the disk 34a. The fly height controller 57 may repeat this process to detect another combination of a second RSS heater signal 59 level and a second write current level that causes the head 20a to contact the disk 34a a second time. The fly height controller 57 can then be calibrated based on a combination of the first and second RSS heater signal levels and first and second write current levels, which may improve accuracy of the calibration process.

Figure 5:
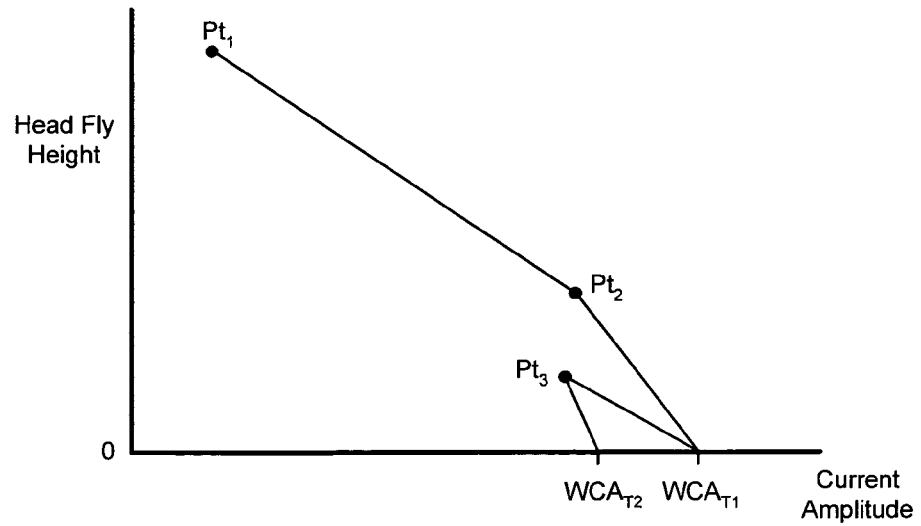
FIG. 5 is a graph that illustrates operations and methods for calibrating a fly height controller using a heater signal provided to a heater element and using write current to cause a head to contact a disk in accordance with some embodiments.

FIG. 5 is a graph that illustrates operations and methods which initially attempt to calibrate the fly height controller 57 using the RSS heater signal 59, without using write current, to attempt to cause the head 20a to contact the disk 34a, and then, in response to no contact, then carry out the calibration using the RSS heater signal 50 in combination with write current to further heat the head 20a and cause it to contact the disk 34a. Accordingly, the X-axis represents the combined amplitude of the RSS heater signal 59 and the write current conducted through the head 20a. Referring to FIG. 5, at initial point $Pt_1$, the RSS heater signal 59 is set to an initial value (at Block 402 of FIG. 4) and the write current amplitude ("WCA" in FIG. 5) is set/maintained at about zero. The RSS heater signal 59 is then increased until it reaches an operational limit at point $Pt_2$, where it is determined that the fly height of head 20a is not zero and, therefore, the head 20a has not yet contacted the disk 34a (at Blocks 404, 406, 410 of FIG. 4).

The write current assist calibration process (at Block 412) is then used to further heat the head 20a and cause it to contact the disk 34a, as will now be described with reference to FIGS. 5 and 6. FIG. 6 is a flow chart that illustrates operations and methods 600 for calibrating the fly height controller 46 by controlling write current amplitude ("WCA" in FIG. 6) to further heat the head 20a and cause it to contact the disk 34a.

Because the write current conducted through the head 20a may erase data on the disk 34a, the head 20a is moved (at Block 602) to a selected track on the disk 34a where erasure is permitted. The RSS heater signal 59 is set (at Block 604) to the operational limit value (RSSmax). The fly height controller 57 controls the read write channel 50 (at Block 606) so that the write current during the calibration process will have about zero amplitude of write current overshoot (WCO) and about zero WCO pulse width (WCOW). The fly height controller 57 also sets the write current amplitude to about zero.

A determination is made (at Block 608) as to whether the head 20a is contacting the disk 34a. In response to determining that contact is occurring, the value of the RSS heater signal 59 is incremented (at Block 610) by a defined amount (e.g., an incremental value), and the operational RSS heater signal level is determined (at Block 612) based on the level of the RSS heater signal 59 at contact (e.g., the operational limit value (RSSmax)) reduced by an amount that is sufficient to provide a threshold read clearance between the head 20a and the disk 34a during read operations. The fly height controller 57 may then set the RSS heater signal 59 to the determined operational RSS heater signal level during subsequent read operations.

In contrast, when the head 20a is determined (at Block 608) to not be contacting the disk 34a, the head 20a is increasingly heated until it contacts the disk 34a. In particular, the write current is increased (at Block 614) by an incremental value. A determination is made (at Block 616) as to whether the head 20a is contacting the disk 34a, and, if not, the operations loop-back to further increment the write current (at Block 614). When the head 20a is determined to be contacting the disk 34a, the write current at touchdown ($WCA_{T1}$) is determined (at Block 618) to be the level of the write current that caused the head 20a to contact the disk 34a. An exemplary effect of the increasing amplitude of the write current on the decreasing head fly height until touchdown of the head 20a is illustrated in FIG. 5 from point $Pt_2$ to the first touchdown point at $WCA_{T1}$.

The level of the RSS heater signal 59 is reduced (at Block 620) by an amount that is sufficient to provide a threshold amount of fly height clearance (shown in FIG. 5 as point $Pt_3$) before the head 20a is further heated with a higher amplitude write current so as to cause a second touchdown onto the disk 34a. The write current is then incremented (at Block 622) by an incremental value. A determination is made (at Block 624) as to whether the head 20a is contacting the disk 34a, and, if not, the operations loop-back to further increment the write current (at Block 622). In contrast, when the head 20a is determined (at Block 624) to have contacted the disk 34a, the write current at touchdown ($WCA_{T2}$) is determined (at Block 626) to be the level of the write current that caused the head 20a to contact the disk 34a the second time during the calibration process. An exemplary effect of the increasing amplitude of the write current on the decreasing head fly height until the second touchdown of the head 20a is illustrated in FIG. 5 from point $Pt_3$ to the second touchdown point at $WCA_{T2}$.

The additional amount of heating, beyond that provided by the RSS heater signal 59 at its operational limit (RSSmax), which is needed to cause the head 20a to contact the disk 34a can be determined based on the determined first and second write currents at touchdown ($WCA_{T1}$ and $WCA_{T2}$). In particular, the equivalent additional RSS heater signal 59 ($RSS_T$) which is beyond the operational limit of the RSS heater signal can be determined based on the following Equation 1:

$$RSS_T = \frac{(WCA_{initial} - WCA_{T1})}{(WCA_{T1} - WCA_{T2})} * (WCA_{T1} - ThresholdTestClearanceValue),$$

where: $WCA_{initial}$ is the initial level of the write current amplitude, which was set to zero (at Block 606); $WCA_{T1}$ is the write current that caused the head 20a to contact the disk 34a the first time (at Block 618); $WCA_{T2}$ is the write current that caused the head 20a to contact the disk 34a the second time (at Block 626); and the "ThresholdTestClearanceValue" is the amount that the RSS heater signal 59 is reduced (at Block 620) to provide the threshold amount of fly height clearance after the head 20a contacted the disk 34a the first time.

The total RSS heater signal 59 ($RSS_{ET}$) which is sufficient to cause the head 20a to contact the disk 34a is determined (at Block 630) as the sum of the operational limit (RSSmax) and the equivalent additional RSS heater signal 59 ($RSS_T$). The operational RSS heater signal level is determined (at Block 632) to be the total RSS heater signal 59 ($RSS_{ET}$) reduced by an amount that is sufficient to provide a threshold read clearance between the head 20a an the disk 34a during read operations. The fly height controller 57 may then set the RSS heater signal 59 to the determined operational RSS heater signal level (from Block 632) during subsequent read operations by the head 20a.

Further explanation of these operations is provided by the following numerical example in which it is assumed that the ThresholdTestClearanceValue is 8, $WCA_{T1}$ is 24, $WCA_{T2}$ is 37, and $WCA_{initial}$ is 0. Accordingly, $RSS_T$ is equal to (0-24)/(24-37)*8, which is 14.76, or about 15 incremental units of the RSS heater signal. Accordingly, contact between the head 20a and disk 34a should happen at an estimated RSSmax plus $RSS_T$. If RSSmax is 255 (not limited by a maximum heater capability), then the equivalent heater value that would cause contact is 270 (255 plus 15) units. Then, allowing a threshold read clearance of 2 nm, which corresponds to a heater signal register setting RSSm of 32 incremental units, the resulting RSS heater signal value is 238 (270–32) units. It is noted that if the write current assist operations had not been used to cause head to disk contact, the write assist power may have been determined to be 223 units (255–32), which is 15 units (238–223), or about a 1 mm difference in the read fly height clearance margin that would occur between using and not using the write current assist heating to calibrate fly height. Using the write current assist operations to calibrate fly height may thereby improve the performance of a head when reading from a disk.

The fly height controller 57 may repeat the calibration operations 600 to determine operational RSS heater signal levels at a plurality of radial locations across the disk 34a. The fly height controller 57 may then vary the operational RSS heater signal level that is used to heat the head 20a based on a calibrated operational RSS heater signal level for the radial location at which data is to be read. Accordingly, fly height variations that can occur as a function of radial location on a disk (e.g., inner diameter, middle diameter, outer diameter) can be compensated for by calibrating the fly height controller 57 at a plurality of radial locations across the disk 34a. The fly height controller 57 may repeat the calibration operations 600 for each of the heads 20a-d to compensate for the unique fly height characteristics of each of the heads 20a-d.

Figure 7:
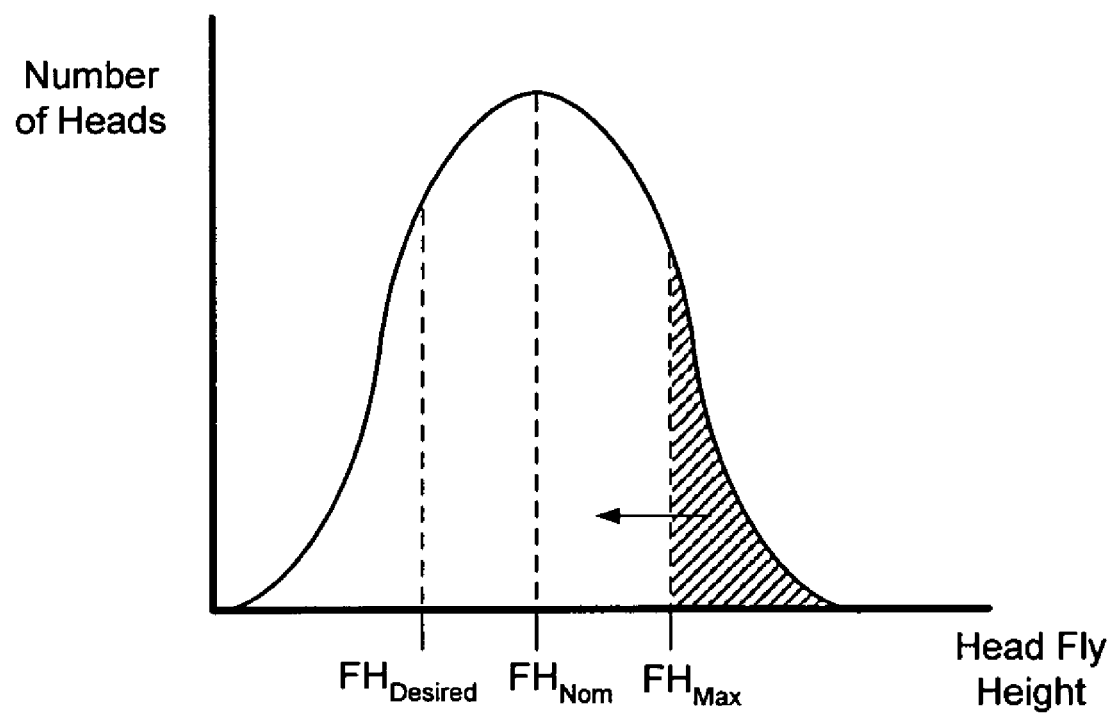
FIG. 7 is a graph of potential variation between the fly height of heads due to manufacturing tolerances, and a potential effect of calibrating a fly height controller using write current to assist in causing head to disk contact in accordance with some embodiments.

FIG. 7 is a graph of an amount of fly height variation that may occur among various numbers of heads, when subjected to the same temperature and/or environmental conditions, due to manufacturing tolerances. The illustrated desired fly height ($FH_{Desired}$) is less than a nominal fly height of the heads ($FH_{Nom}$) that occurs when the heads are not being heated via heater elements. The heads having the nominal fly height of the heads ($FH_{Nom}$) can be heated using heater elements to reduce their fly height down to the desired fly height ($FH_{Desired}$) during read operations. Using the calibration operations 400 shown in FIG. 4, the heads having fly heights between the higher maximum fly height ($FH_{Max}$) and the desired fly height ($FH_{Desired}$), can be sufficiently heated using heater elements with the RSS heater signal 59 being less than or equal to the operational limit (RSSmax) to cause the heads to contact adjacent disks and so that the fly height controller 57 can calibrate the operational RSS level for the heads. However, the heads which have a fly height that is higher than the maximum fly height ($FH_{Max}$) cannot be sufficiently heated to contact adjacent disks using the heater elements alone because the equivalent RSS level would exceed the operational limit of the heater elements. In accordance with various embodiments, a write current can be conducted through those higher flying height heads so as to cause them to contact adjacent disks. Accordingly, the fly height controller 57 may determine the equivalent RSS level at touchdown ($RSS_{ET}$) (Block 630 of FIG. 6) for the heads having a fly height that exceeds the maximum fly height ($FH_{Max}$) using a combination of heating from the heater elements and heating from the write current conducted through the heads. The fly height controller 57 can thereby calibrate its fly height control of those heads to determine the operational RSS value to be used control the fly-height of those heads during read operations.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of calibrating a fly height controller, the method comprising:

applying a heater signal to a heater element to heat a read/write head;

increasing a write current conducted through the head to further heat the head until the head contacts a data storage disk; and calibrating the fly height controller based on at least a first level of the heater signal level and a first level of the write current when the head contacts the disk.

2. The method of claim 1, wherein calibrating the fly height controller comprises determining a read operation heater signal level, which is to be applied to the heater element to control fly height while the head is reading data from the disk, based on the first heater signal level and the first write current level.

3. The method of claim 2, wherein the read operation heater signal level is determined based on a ratio of the first write current level to the first heater signal level.

4. The method of claim 1, further comprising:

while the head is not being heated by the write current, increasing the heater signal until either a threshold level is reached or the head contacts the disk; and when the head contacts the disk before the heater signal reaches the threshold level, calibrating the fly height controller based on a level of the heater signal when the head contacted the disk.

5. The method of claim 4, wherein, when the head does not contact the disk and the heater signal reaches the threshold level, applying a defined level of the heater signal to the heater element, and carrying out the increasing the write current and the calibrating the fly height controller based on at least a first heater signal level and a first level of the write current when the head contacts the disk.

6. The method of claim 5, wherein applying the heater signal at a defined level to the heater element comprises setting the heater signal to about a maximum operational level.

7. The method of claim 1, further comprising:

in response to the head contacting the disk, decreasing the heater signal by an amount that is sufficient to cause at least a threshold fly height between the head and the disk;

increasing the write current above the first write current level until the head contacts the disk a second time; and determining a level of the heater signal and a level of the write current when the head contacts the disk the second time as a second heater signal level and a second write current level, respectively, wherein the fly height controller is calibrated based on the first and second heater signal levels and the first and second write current levels.

8. The method of claim 7, wherein the fly height controller is calibrated based on a ratio of a combination of the first and second write current levels to a combination of the first and second heater signal levels.

9. The method of claim 8, wherein the fly height controller is calibrated based on a ratio of a difference between the first and second write current levels to a difference between the first and second heater signal levels.

10. The method of claim 7, wherein calibrating the fly height controller based on the first heater signal level and the first write current level comprises determining a read operation heater signal level, which is to be supplied to the heater element to control fly height while the head is reading data from the disk, based on the first and second heater signal levels and the first and write current levels.

11. The method of claim 10, wherein the read operation heater signal level is determined based on a ratio of a combination of the first and write current levels to a combination of the first and second heater signal levels.

12. The method of claim 1, further comprising:
repeating the applying a heater signal and the increasing a write current with the head positioned at a plurality of radial locations across the disk; and
calibrating the fly height controller based on a combination of the first heater signal level and the first write current level determined at each of the plurality of radial locations.

13. The method of claim 12, further comprising calibrating the fly height controller based on an average of the first heater signal level and the first write current level determined at each of the plurality of radial locations.

14. The method of claim 1, wherein the fly height controller controls fly heights of a plurality of read/write heads relative to a plurality of data storage disks, the method further comprising:
repeating the applying a heater signal, the increasing a write current, and the calibrating a fly height controller for each of the plurality of heads.

15. A hardware circuit comprising:
a fly height controller that applies a heater signal to a heater element to heat a read/write head, that increase a write current conducted through the head to further heat the head until the head contacts a data storage disk, and that calibrates its control of head fly height based on at least a first level of the heater signal and a first level of the write current when the head contacts the disk.

16. The circuit of claim 15, wherein the fly height controller determines a read operation heater signal level, which is to be applied to the heater element to control fly height while the head is reading data from the disk, based on the first heater signal level and the first write current level.

17. The circuit of claim 15, wherein, while the head is not being heated by the write current, the fly height controller increases the heater signal until either a threshold level is reached or the head contacts the disk, and, when the head contacts the disk before the heater signal reaches a threshold level, the fly height controller calibrates its control of head fly height based on a level of the heater signal when the head contacted the disk.

18. The circuit of claim 17, wherein, when the head does not contact the disk and the heater signal reaches the threshold level, the fly height controller applies a defined level of the heater signal to the heater element and carries out the increasing the write current and the calibration of its control of head fly height based on at least the first heater signal level and the first write current level.

19. The circuit of claim 15, wherein the fly height controller responds to the head contacting the disk by decreasing the heater signal by an amount that is sufficient to cause at least a threshold fly height between the head and the disk, by increasing the write current above the first write current level until the head contacts the disk a second time, by determining a level of the heater signal and a level of the write current when the head contacts the disk the second time as a second heater signal level and a second write current level, respectively, and by calibrating its control of head fly height based on the first and second heater signal levels and the first and second write current levels.

20. A method of calibrating a fly height controller, the method comprising:
applying a first level of heater signal to a heater element to heat a read/write head;
increasing a write current conducted through the head to a first write current level that is sufficient to cause the head to contact a data storage disk;
in response to the head contacting the disk, decreasing the heater signal to a second level which is sufficient to cause at least a threshold fly height between the head and the disk;
increasing the write current above the first write current level to a second write current level that is sufficient to cause the head to again contact the disk; and
calibrating the fly height controller based on the first and second heater signal levels and the first and second write current levels.

* * * * *